(12) United States Patent
Evrard et al.

(10) Patent No.: US 10,969,502 B2
(45) Date of Patent: Apr. 6, 2021

(54) POSITRON OR BETA PARTICLE DETECTOR

(71) Applicant: MIRION TECHNOLOGIES (CANBERRA OLEN) NV, Olen (BE)

(72) Inventors: Olivier Roger Valère Vincent Evrard, Olen (BE); Wilhelm Friedrich Mueller, Meriden, CT (US); Sofie Antonie Joanna Put, Olen (BE)

(73) Assignee: MIRION TECHNOLOGIES (CANBERRA OLEN) NV, Olen (BE)

( * ) Notice: Subject to any disclaimer, the term of this patent is extended or adjusted under 35 U.S.C. 154(b) by 35 days.

(21) Appl. No.: 16/487,803

(22) PCT Filed: Mar. 20, 2017

(86) PCT No.: PCT/US2017/023248
§ 371 (c)(1),
(2) Date: Aug. 21, 2019

(87) PCT Pub. No.: WO2018/174852
PCT Pub. Date: Sep. 27, 2018

(65) Prior Publication Data
US 2020/0057168 A1    Feb. 20, 2020

(51) Int. Cl.
*G01T 1/24* (2006.01)
*G01T 1/20* (2006.01)

(52) U.S. Cl.
CPC ............ *G01T 1/242* (2013.01); *G01T 1/2006* (2013.01)

(58) Field of Classification Search
CPC .............................. G01T 1/242; G01T 1/2006
See application file for complete search history.

(56) References Cited

U.S. PATENT DOCUMENTS

| 2005/0161609 | A1 | 7/2005 | Heismann | |
| 2008/0191138 | A1* | 8/2008 | Kastalsky | G01T 1/2928 250/361 R |
| 2020/0319353 | A1* | 10/2020 | Berlin | G01T 1/2006 |

FOREIGN PATENT DOCUMENTS

WO    2007/093913    8/2019

OTHER PUBLICATIONS

International Search Report in international application No. PCT/US2017/023248, dated Jan. 1, 2018.
The Written Opinion of the International Search Authority in international application No. PCT/US2017/023248, dated Sep. 27, 2018.
PCT Invitation from PCT/US2017/023248 dated Nov. 21, 2017 with partial search results.

(Continued)

*Primary Examiner* — Hugh Maupin
(74) *Attorney, Agent, or Firm* — Ladas & Parry, LLP

(57) ABSTRACT

A positron or beta particle detector comprising a first radiation sensor made of a first material and having a first thickness between a first surface and a second surface; and a second radiation sensor made of a second material and having a second thickness between a first surface and a second surface, the second radiation sensor being arranged at a first distance from the first radiation sensor; wherein the first material and the first thickness are such that a positron or beta particle can traverse the first radiation sensor from first to second surface and hit the first surface of the second radiation sensor.

28 Claims, 12 Drawing Sheets

(56) References Cited

OTHER PUBLICATIONS

PCT International Search Report from PCT/US2017/023248 dated Jan. 17, 2018.
PCT International Preliminary Report on Patentability (Chapter I) with Written Opinion from PCT/US2017/023248 dated Oct. 3, 2019.
Office action from European Patent Application No. 17715329.3 dated Dec. 15, 2020.

* cited by examiner

Providing a first radiation sensor made of a first material and having a first thickness between a first surface and a second surface, wherein: the first material and the first thickness are such that a positron or beta particle can traverse the first radiation sensor from first to second surface, thus losing a first energy Providing a second radition sensor made of a second material having a second thickness between a first surface and a second surface, the first surface of the second radiation sensor being arranged at a first distance from the second surface of the first radiation sensor Generating a first sensor signal in response to a radiation particle losing said first energy in the first radiation sensor; the first sensor signal being proportional to said first energy Generating a second sensor signal in response to a radiation particle losing a second energy in the second radiation sensor; the second sensor signal being proportional to said energy Issuing a detection signal if the first and second sensor signals indicate a radiation particle losing said second energy in the second radiation sensor within a predetermined time range after a radiation particle losing said first energy in said first radition sensir and if the ratio of the second sensor signal is within a predetermined ratio range and not issuing said detection signal otherwise.

FIG. 9

POSITRON OR BETA PARTICLE DETECTOR

The present application is the U.S. national phase application of PCT Application No. PCT/US2017/023248 filed on Mar. 20, 2017, the disclosure of which is incorporated herein in its entirety by reference.

TECHNICAL FIELD

This presentation is directed in general to the field of radiation detectors and in particular positron or Beta particle detectors.

BACKGROUND

The development of compact radio-isotope generators has helped making radiotherapy and medical imaging more affordable and easier to use in the field of oncology. For example, Di-Fluoro Glucose can be injected to a cancer patient, and concentrate in the metastatic tissues of the patient since cancer cells are avid of Glucose. F18 present in the Di-Fluoro Glucose then emits positrons that ultimately annihilate with electrons and produce pairs of 511 keV gammas.

A timed detection of gammas can be used in Positron emission tomography (PET) imagery prior to tumour excision surgery: the gammas resulting from the annihilation of positrons can for example be detected by a gamma detector such as a PMT coupled to a scintillator or to a silicon detector Intra operative probes are progressively appearing that allow localizing malignant tissues accurately during a tumour excision, thus allowing to reduce the number of successive operations. Hand held Beta probes have for example been experimented during the excision of F18 avid tumours, since the positrons emitted by F18 can also be directly detected by a positron or Beta particle detector.

At present, most probes on the market are non-imaging gamma probes that are used during surgery, typically for sentinel lymph node dissection and parathyroid adenoma resection. However, the effectiveness of these probes is limited because they suffer from a lack of ancillary information of the surveyed area, such as the clear delineation of margins of radioactive tissue. Indeed, the highly penetrating gamma radiation present locally or even in remote parts of the body increases the background radiation level and further limits the discriminating value.

On another hand, it is known that positrons or Beta particles do not propagate far in a body, whereby positron or Beta particle probes are promising candidates for accurately determining the margins of a tumour.

Positron detectors based on scintillators, for example using a CaF2 crystal coupled to a Photo-Multiplier Tube (PMT), were made. Other scintillators are known to use poly-crystalline para-terphenyl doped with diphenylbutadiene, coupled to a Photo-Multiplier Tube (PMT).

FIG. 1 represents schematically a cross-section of a known Beta particle detector 10 comprising a 0.4 mm thick CsI:Tl scintillator 12 film optically coupled to a 1 mm thick LYSO crystal scintillator 14, itself coupled to a Si Photo Multiplier (SiPM) array 16. While the CsI:Tl layer 12 acts as a detector of Beta particles 18, the LYSO scintillator 14 detects gamma radiations 20. The Gamma response is then subtracted from the total signal received to improve Signal Noise Ratio (SNR) and contrast. The thickness of the LYSO scintillator is optimized such that it acts a light diffuser to spread the scintillation light generated in CsI:Tl over multiple SiPM pixels for accurate estimation of the Beta particle interaction location.

FIG. 2 represents schematically a cross-section of a known Beta particle detector 22 comprising a Beta-sensitive plastic scintillator 24 which is relatively insensitive to gamma radiation (although a small amount is always detected). A reference gamma detector 26 is placed near the Beta detector 22. Positrons or Beta particles emitted more than a few millimetres under the beta probe are stopped in the tissue. Gamma rays from the background may generate some counts in the front detector 24. To subtract this count rate, "reference" detector 26 is added which counts the Gamma rays only.

There remains a need for a Positron or Beta particle detector that allows discriminating more efficiently between Gamma particles and Positron or Beta particles and offers a superior Signal to Noise Ratio and contrast.

SUMMARY

To address one or more of the above-deficiencies of the prior art, one embodiment described in this presentation relates to a Positron or Beta particle detector comprising at least two radiation sensors; a first sensor being thin enough so that a Positron (or a Beta particle) can traverse the first sensor without losing all its energy in the first sensor, and the second sensor being arranged so close to the first sensor that such a Positron (or a Beta particle) that traverses the first sensor without losing all its energy hits the second sensor. The detector can then be provided to take in account only pairs of signals measured quasi simultaneously on both sensors. The detector can further be provided to take in account only pairs of signals having energy levels consistent with a same Positron (or a Beta particle) hitting the first then the second sensors.

An embodiment of this presentation comprises a positron or beta particle detector having: a first radiation sensor made of a first material and having a first thickness between a first surface and a second surface; and a second radiation sensor made of a second material and having a second thickness between a first surface and a second surface, the first surface of the second radiation sensor being arranged at a first distance from the second surface of the first radiation sensor; wherein: the first material and the first thickness are such that a positron or beta particle can traverse the first radiation sensor from first to second surface and hit the first surface of the second radiation sensor, a positron or beta particle losing a first energy when traversing the first radiation sensor; the second material and second thickness being such that a positron or beta particle having traversed the first radiation sensor loses a second energy in the second radiation sensor.

According to an embodiment of this presentation, the first energy is equal to the second energy.

According to an embodiment of this presentation, the first material is equal to the second material.

According to an embodiment of this presentation, the first and second sensors each comprise a PIN diode sensor.

According to an embodiment of this presentation, the first thickness is equal to the second thickness.

According to an embodiment of this presentation, the first sensor has a first sensing surface and the second sensor has a second sensing surface; the second sensing surface being larger than the first sensing surface.

According to an embodiment of this presentation, the second sensor is one of an array of second sensors.

According to an embodiment of this presentation, the first radiation sensor is arranged to generate a first sensor signal in response to a radiation particle losing said first energy in the first radiation sensor; and the second radiation sensor is arranged to generate a second sensor signal in response to a radiation particle losing said second energy in the second radiation sensor; the radiation detector being arranged to issue a detection signal if the first and second sensor signals indicate a radiation particle losing said second energy in the second radiation sensor within a predetermined time range after a radiation particle losing said first energy in said first radiation sensor.

According to an embodiment of this presentation, the first radiation sensor is arranged such that said first sensor signal is proportional to said first energy; and the second radiation sensor is arranged such that said second sensor signal is proportional to said second energy; wherein the radiation detector is arranged to issue said detection signal if the ratio of the second sensor signal over the first sensor signal is within a predetermined ratio range.

According to an embodiment of this presentation, at least one of the first and second radiation sensor is a position-sensitive radiation sensor arranged for providing a sensor signal indicative of a position along at least one direction where the particle lost energy in said position-sensitive radiation sensor.

According to an embodiment of this presentation, the position-sensitive radiation sensor comprises two charge sensitive amplifiers connected to opposite ends of the position-sensitive radiation sensor.

According to an embodiment of this presentation, the position-sensitive radiation sensor comprises four charge sensitive amplifiers connected to diagonally opposed ends of the position-sensitive radiation sensor.

According to an embodiment of this presentation, the positron or beta particle detector further comprises a third radiation sensor made of a third material and having a third thickness between a first surface and a second surface, the first surface of the third radiation sensor being arranged at a second distance from the second surface of the second radiation sensor; wherein: the first material and thickness and the second material and thickness are further such that a positron or beta particle can traverse the first radiation sensor from first to second surface, then traverse the second radiation sensor from first to second surface, then hit the first surface of the third radiation sensor, a positron or beta particle having traversed the first and second radiation sensors losing a third energy in the third radiation sensor.

According to an embodiment of this presentation, the first energy is equal to the second energy and to the third energy.

According to an embodiment of this presentation, the first material is equal to the second material and to the third material.

According to an embodiment of this presentation, the first, second and third sensors each comprise a PIN diode sensor.

According to an embodiment of this presentation, the first thickness is equal to the second thickness and to the third thickness.

According to an embodiment of this presentation, the first sensor has a first sensing surface, the second sensor has a second sensing surface and the third sensor has a third sensing surface; the third sensing surface being larger than the second sensing surface and the second sensing surface being larger than the first sensing surface.

According to an embodiment of this presentation, the third sensor is one of an array of third sensors.

According to an embodiment of this presentation, the first radiation sensor is arranged to generate a first sensor signal in response to a radiation particle losing said first energy in the first radiation sensor; the second radiation sensor is arranged to generate a second sensor signal in response to a radiation particle losing said second energy in the second radiation sensor; and the third radiation sensor is arranged to generate a third sensor signal in response to a radiation particle losing said third energy in the third radiation sensor; the positron or beta particle detector being arranged to issue a detection signal if the first, second and third sensor signals indicate: a radiation particle losing said second energy in the second radiation sensor within a first predetermined time range after a radiation particle losing said first energy the first radiation sensor; and a radiation particle losing said third energy in the third radiation sensor within a second predetermined time range after a radiation particle losing said second energy in said second radiation sensor.

According to an embodiment of this presentation, the first radiation sensor is arranged such that said first sensor signal is proportional to said first energy; the second radiation sensor is arranged such that said second sensor signal is proportional to said second energy; and the third radiation sensor is arranged such that said third sensor signal is proportional to said third energy; wherein the radiation detector is arranged to issue said detection signal if the ratio of the second sensor signal over the first sensor signal is within a first predetermined ratio range and if the ratio of the third sensor signal over the second sensor signal is within a second predetermined ratio range.

According to an embodiment of this presentation, the positron or beta particle detector further comprises a collimator between the first and second radiation sensors; the collimator having an aperture centered on an axis crossing normally the center of the first sensor and being provided for preventing any beta or positron particle not having traversed the first sensor from hitting the second sensor.

According to an embodiment of this presentation, the positron or beta particle detector is arranged in the tip of elongated detector device having a distal window, the distal window comprising one of a polyester resin sheet, a Beryllium window, and a 3D printed Ti sheet; the distal window letting positron or Beta particles hit the detector.

An embodiment of this presentation comprises a radiation detector having: a positron or beta particle detector as described above; and a scintillator layer sensitive to gamma particles, the scintillator layer having a first surface arranged facing the second surface of the second radiation sensor, such that radiation particles generated by the scintillator in response to being hit by a gamma particle hit the second surface of the second radiation sensor.

According to an embodiment of this presentation, the first radiation sensor is arranged to generate a first sensor signal in response to a radiation particle losing said first energy in the first radiation sensor; and the second radiation sensor is arranged to generate a second sensor signal in response to a radiation particle losing energy in the second radiation sensor; the radiation detector being arranged to issue a positron or beta particle detection signal if the first and second sensor signals indicate a radiation particle losing energy in the second radiation sensor within a predetermined time range after a radiation particle losing said first energy in said first radiation sensor; and the radiation detector being arranged to issue a gamma particle detection signal if the first and second sensor signals indicate a radiation particle losing energy in the second radiation sensor not within said predetermined time range after a radiation particle losing said first energy in said first radiation sensor; or a radiation particle losing energy in the first radiation sensor not within said predetermined time range before a radiation particle losing energy in said second radiation sensor.

According to an embodiment of this presentation, the second radiation sensor is a Silicon Drift Detector.

According to an embodiment of this presentation, the Silicon Drift Detector comprises two anodes on its first surface; the radiation detector being arranged to issue: a direct hit second sensor signal in response to only one of the two anodes detecting a radiation particle losing energy in the second radiation sensor; and a scintillation second sensor signal in response to the two anodes detecting simultaneously a radiation particle losing energy in the second radiation sensor.

An embodiment of this presentation comprises a radiation detector having a positron or beta particle detector as detailed above; and a gamma particle detector.

According to an embodiment of this presentation, the gamma particle detector is a 4-quadrants gamma particle detector.

An embodiment of this presentation comprises a method for detecting positrons or beta particles, the method including: providing a first radiation sensor made of a first material and having a first thickness between a first surface and a second surface; and providing a second radiation sensor made of a second material and having a second thickness between a first surface and a second surface, the first surface of the second radiation sensor being arranged at a first distance from the second surface of the first radiation sensor; wherein: the first material and the first thickness are such that a positron or beta particle can traverse the first radiation sensor from first to second surface and hit the first surface of the second radiation sensor, a positron or beta particle losing a first energy when traversing the first radiation sensor; the second material and second thickness being such that a positron or beta particle having traversed the first radiation sensor loses a second energy in the second radiation sensor.

According to an embodiment of this presentation, the method further includes: with the first radiation sensor, generating a first sensor signal in response to a radiation particle losing said first energy in the first radiation sensor; with the second radiation sensor, generating a second sensor signal in response to a radiation particle losing said second energy in the second radiation sensor; and issuing a detection signal if the first and second sensor signals indicate a radiation particle losing said second energy in the second radiation sensor within a predetermined time range after a radiation particle losing said first energy in said first radiation sensor.

According to an embodiment of this presentation, the first radiation sensor is arranged such that said first sensor signal is proportional to said first energy; and the second radiation sensor is arranged such that said second sensor signal is proportional to said second energy; the method further comprising issuing said detection signal if the ratio of the second sensor signal over the first sensor signal is within a predetermined ratio range and not issuing said detection signal otherwise.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of this presentation and its advantages, reference is now made to the following description taken in conjunction with the accompanying drawings, in which like reference numerals represent like parts:

FIG. 9 illustrates a method according to an embodiment of this presentation.

DETAILED DESCRIPTION

It should be understood at the onset that, although example embodiments are illustrated below, the present technology may be implemented using any number of techniques, whether currently known or not. The present technology should in no way be limited to the example implementations, drawings, and techniques illustrated below. Additionally, the drawings are not necessarily drawn to scale.

Figure 1:
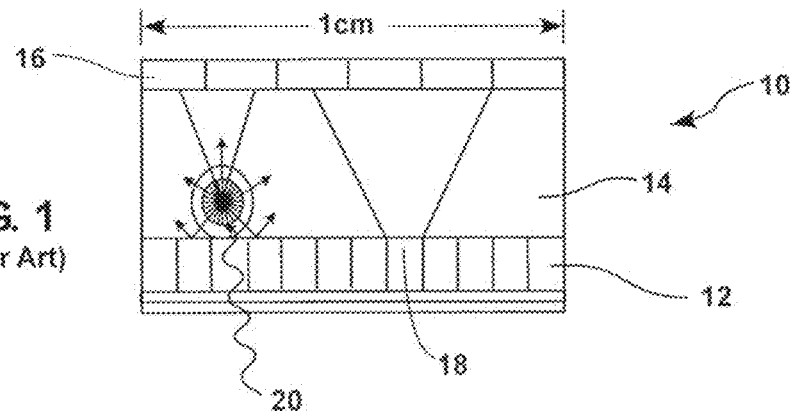
FIG. 1 illustrates a known Beta particle detector.
Figure 2:
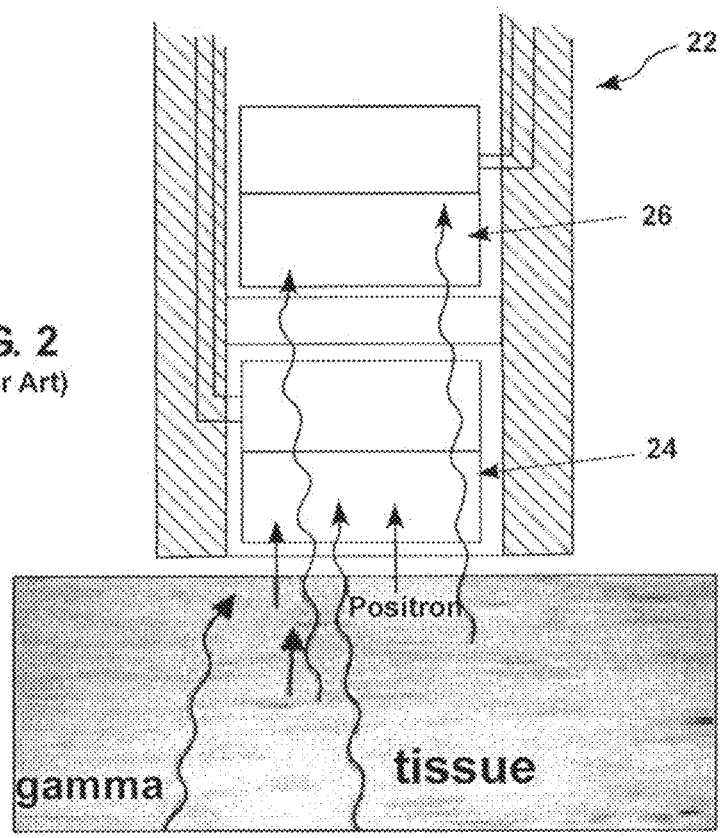
FIG. 2 illustrates a known Beta particle detector.
Figure 3:
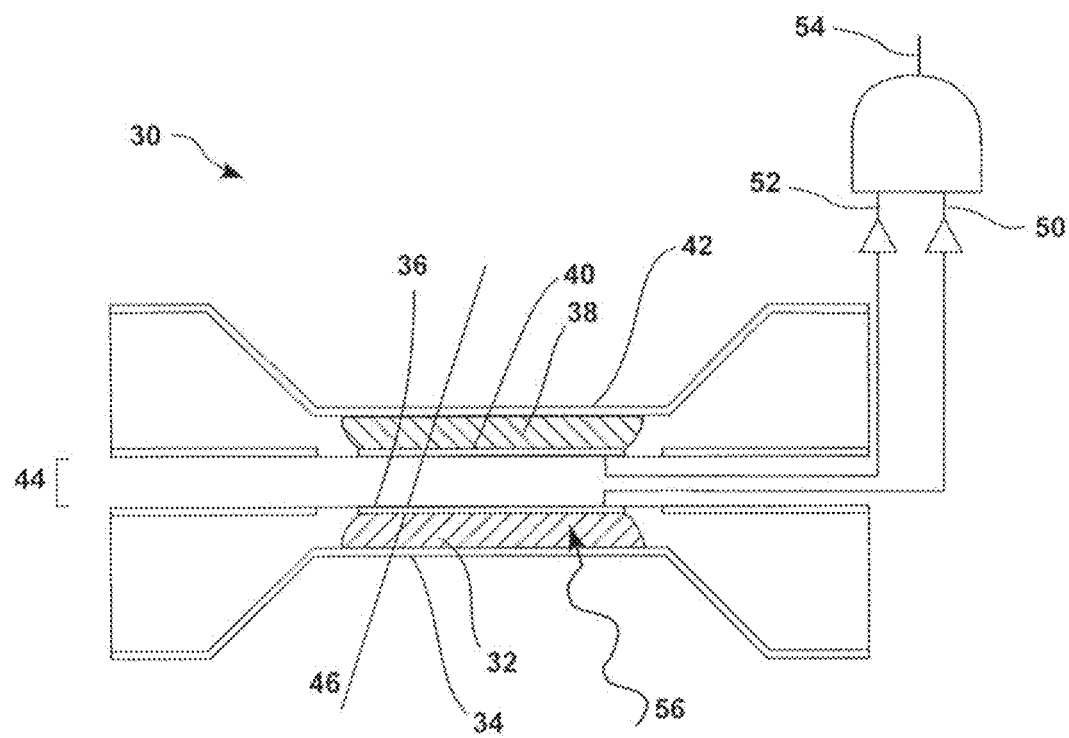
FIG. 3 illustrates a Positron or Beta particle detector according to an embodiment of this presentation.

FIG. 3 illustrates a cross-section of a Positron or Beta particle detector 30 according to an embodiment of this presentation, comprising: a first radiation sensor 32 made of a first material and having a first thickness between a first surface 34 and a second surface 36; and a second radiation sensor 38 made of a second material and having a second thickness between a first surface 40 and a second surface 42, the first surface 40 of the second radiation sensor 38 being arranged at a first distance 44 from the second surface 36 of the first radiation sensor 32. According to an embodiment of this presentation, the first material and the first thickness are such that a positron or a beta particle 46 can traverse the first radiation sensor 32 from its first surface 34 to its second surface 36 and hit the first surface 40 of the second radiation sensor 38, losing a first energy when traversing the first radiation sensor 32.

According to an embodiment of this presentation and as illustrated in FIG. 3, sensor 32 can be a fully depleted Silicon PIN diode radiation sensor having an anode ohmic contact on its first surface 34 and a cathode doped layer on its second surface 36. Alternatively, the anode can be on the second surface and the cathode on the first surface. Alternatively, sensor 32 can be a partially depleted PIN diode radiation sensor, or a Silicon Drift Detector radiation sensor. According to an embodiment of this presentation, the cathode of the PIN diode can be formed on a Si substrate with a typical resistivity of 5000 Ωcm by a doping of Boron with a concentration of $10^{18}$ cm$^{-3}$ on a depth of 300 nm below surface 36, and the anode ohmic contact can be formed by a doping of $10^{18}$ cm$^{-3}$ with a concentration of Phosphor on a depth of 300 nm below surface 34.

According to an embodiment of this presentation, sensor 32 can have a thickness comprised between 30 and 300 micrometer; for example 150 micrometer. As illustrated in FIG. 3, sensor 32 can be formed on a portion (e.g. center) of a wafer 48 that was thinned-out, for example by plasma or chemical etching.

Beta particles as well as positrons emitted by Beta particle or positron sources have an energy uniformly spread between 0 and their endpoint energy, which is 633 Key for F-18. The inventors have noted that positrons or Beta particles can traverse a thin sensor, such as a thin PIN diode sensor using a thin layer of Silicon, and lose only a portion of their energy.

Table 1 below shows measurements of the energy lost in Silicon layers of various thickness or depth by a 600 KeV positron or Beta particle while traversing said layers.

TABLE 1

| Depth [μm] | Energy lost in silicon (keV) | Energy transmitted in silicon (keV) |
| --- | --- | --- |
| 0 | 17 keV | 583 keV |
| 30 | 33 keV | 567 keV |
| 60 | 54 keV | 546 keV |
| 89 | 75 keV | 525 keV |
| 119 | 93 keV | 507 keV |
| 149 | 113 keV | 487 keV |
| 179 | 135 keV | 465 keV |
| 209 | 155 keV | 445 keV |
| 238 | 179 keV | 421 keV |
| 268 | 203 keV | 397 keV |
| 298 | 224 keV | 376 keV |

As outlined above, according to an embodiment of this presentation the first material and the first thickness are such that a positron or a beta particle 46 can traverse the first radiation sensor 32 from its first surface 34 to its second surface 36 and hit the first surface 40 of the second radiation sensor 38, losing a first energy when traversing the first radiation sensor 32. According to an embodiment of this presentation, the second material and the second thickness are such that a positron or beta particle having traversed the first radiation sensor 32 loses a second energy in the second radiation sensor 38.

According to an embodiment of this presentation, the first material can be the same as the second material. For example, both sensor 32 and sensor 38 can comprise a Silicon PIN diode sensor. According to an embodiment of this presentation, the first thickness can be equal to the second thickness. Sensor 32 can be identical to sensor 38. As illustrated in FIG. 3, where sensors 32 and 38 are PIN diodes, the sensors 32 and 38 can be flipped with respect to each other. According to an embodiment of this presentation, the first and second thicknesses can be selected so that the first energy is equal to the second energy According to an embodiment of this presentation, the first radiation sensor 32 is arranged to generate a first sensor signal 50 in response to a radiation particle losing a first energy in the first radiation sensor 32; and the second radiation sensor 38 is arranged to generate a second sensor signal 52 in response to a radiation particle losing a second energy in the second radiation sensor 38. According to an embodiment of this presentation, the distance 44 between sensor 32 and sensor 38 is such that a positron or beta particle 46 having traversed the first radiation sensor 32 hits the second radiation sensor 38 and loses the second energy within a predetermined time range after losing said first energy in said first sensor 32.

According to an embodiment of this presentation, the radiation detector 30 is arranged to issue a detection signal 54 if the first sensor signal 50 and the second sensor signal 52 indicate a radiation particle losing said second energy in the second radiation sensor 38 within said predetermined time range after a radiation particle losing said first energy in said first radiation sensor 32. Otherwise no detection signal 54 is issued. In other terms (assuming the signals 50 and 52 are formed by the respective electronics of sensors 32, 38 at a same speed), detection signal 54 is formed only if signal 52 is formed within said predetermined time range after signal 50 was formed. According to an embodiment of this presentation, distance 44 can be provided such that, when produced in response to a same positron or Beta particle losing energy in sensor 32 and then in sensor 38, the signals 50 and 52 sent to an AND circuit are sufficiently close in time to produce a "1" in output of the AND circuit. In such an instance, the sensors are so close and so thin that the predetermined time range between two sensor signals is so small that the two sensor signals can be considered as "simultaneous" by the detection circuit 126.

For example, for two detectors with an area of 0.5 mm$^2$ and 200 μm thick, stacked on top of each other with 2 mm spacing, said predetermined time range can be up to 3 μs. Such a predetermined time range can be considered as so small that signals 50 and 52 are seen as simultaneous by for example a CMOS AND circuit.

It is known that positrons or Beta particles do not travel far in water, or in the body of a patient, which is comprised of a lot of water. Table 2 below shows measurements of the energy lost in water or tissue of various thickness or depth by a 600 KeV positron or Beta particle while traversing said water or tissue.

TABLE 2

| Depth [μm] | Energy lost in water or tissue (keV) | Energy transmitted in silicon (keV) |
| --- | --- | --- |
| 0 | 14 keV | 586 keV |
| 121 | 29 keV | 571 keV |
| 242 | 44 keV | 556 keV |
| 363 | 58 keV | 542 keV |
| 484 | 73 keV | 527 keV |
| 604 | 88 keV | 512 keV |
| 725 | 105 keV | 495 keV |
| 846 | 125 keV | 475 keV |
| 967 | 146 keV | 454 keV |
| 1088 | 163 keV | 437 keV |
| 1209 | 180 keV | 420 keV |

Table 2 shows that a 600 KeV positron can traverse 1.2 mm of tissue and still have an energy of 420 KeV, well enough to traverse (see table 1) for example a first then a second identical sensors having a thickness of 298 micrometer. It follows that a detector according to an embodiment of this presentation can be capable of detecting a positron or Beta particle emitted from a location 1.2 mm deep in a body tissue.

The Inventors have noted that a Gamma particle 56 directed at detector 30 can either lose significant (first) energy in sensor 32; or pass through sensor 32 without losing significant energy and lose significant energy in sensor 38; or pass through sensor 32 and 38 without losing energy. Further, a Gamma particle 56 losing a first energy in sensor 32 will trigger a Compton scattering in sensor 32, which will not necessarily result in the emission of a photoelectron toward sensor 38. It follows that, when a Gamma particle 56 loses a first energy in sensor 32, prompting sensor 32 to generate a sensor signal 50, sensor 38 will not necessarily receive energy from the Gamma particle 56 and thus sensor 38 will not necessarily generate a signal 52 shortly after sensor signal 50. According to an embodiment of this presentation, detector 30 does not issue a detection signal 54 if only one of sensor signals 50, 52 is produced within a predetermined time range, which allows detection signal 54 to be indicative of positrons or Beta particles, and not Gamma particle in most cases. At this juncture, it is noted that in case a Gamma particle hits sensor 38 first, a signal 52 will be generated but the chances of a photo electron hitting sensor 32 to generate a signal 50 are reduced.

According to an embodiment of this presentation, detector 30 can be provided for only taking in account a signal 52 generated after signal 50, to further filter out signals 50 or 52 not resulting from a positron or Beta particle.

Further to the above considerations, the Inventors have noted that, even in the unlikely event where a Gamma particle 56 loses a first energy in sensor 32, prompting sensor 32 to generate a sensor signal 50, and sensor 38 actually receives energy from the Compton scattering of the Gamma particle 56 in sensor 32, the energy level received in sensor 32 will be significantly larger than the energy level received in sensor 38.

To take advantage of this finding, and according to an embodiment of this presentation, the first radiation sensor 32 can be arranged to generate a sensor signal 50 that is proportional to the energy introduced by a particle traversing the first sensor; the second radiation sensor 38 can be arranged to generate the sensor signal 52 that is proportional to said second energy; and the radiation detector 30 can be arranged to issue detection signal 54 if the ratio of the second sensor signal 52 over the first sensor signal 50 is within a predetermined ratio range. No detection signal 54 is generated otherwise.

Figure 4:
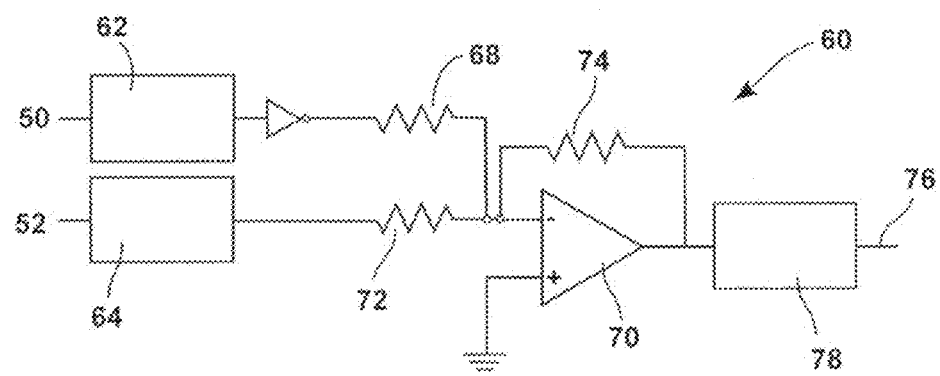
FIG. 4 illustrates an analog divider to be used with a Positron or Beta particle detector according to an embodiment of this presentation.

FIG. 4 illustrates schematically an exemplary analog divider circuit 60 that can be used to calculate the ratio of the second sensor signal 52 over the first sensor signal 50. It is known that a division can be performed by subtraction of logs. Circuit 60 comprises a first logarithmic amplifier 62 receiving sensor signal 50 and a second logarithmic amplifier 64 receiving sensor signal 52. The output of amplifier 62, inverted by an inverter 66, is connected through a resistor 68 to the inverting input of an operational amplifier 70. The output of amplifier 64 is connected through a resistor 72 to the inverting input of operational amplifier 70. The non-inverting input of operational amplifier 70 is connected to the ground. The output of operational amplifier 70 is connected to its inverting input by a resistor 74, and to an output node 76 of divider 60 by an anti-log amplifier 78.

Figure 5:
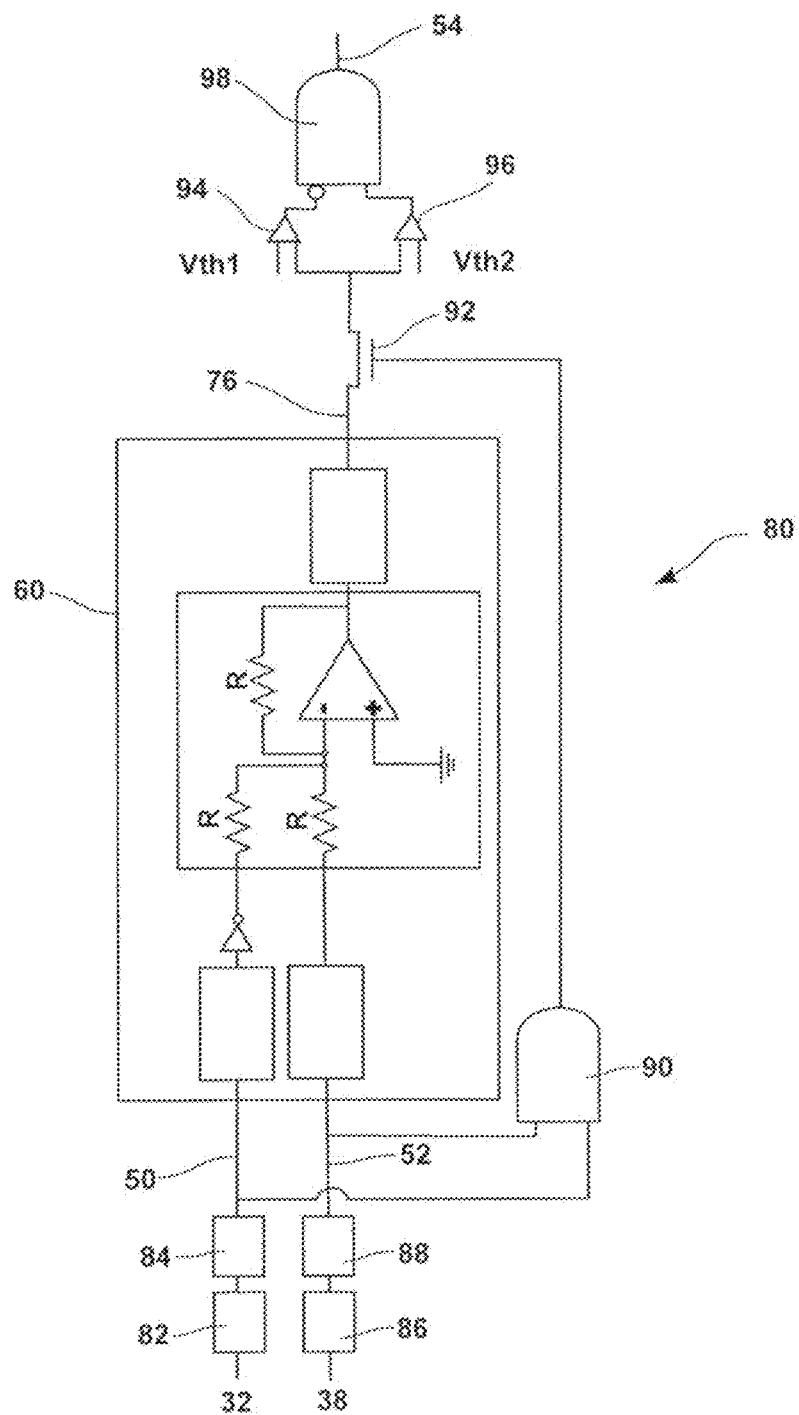
FIG. 5 illustrates a sensor signal processing circuit to be used with a Positron or Beta particle detector according to an embodiment of this presentation.

FIG. 5 illustrates schematically an exemplary circuit 80 for generating a detection signal 54 of a detector according to an embodiment of this presentation. Charge sensitive amplifiers (not shown) are provided in sensors 32 and 38 to provide output signals indicative of the energy received by the sensors. A first shaper 82, followed by a peak stretcher 84, form signal 50 from the output of sensor 32. A second shaper 86, followed by a peak stretcher 88, form signal 52 from the output of sensor 38. Signals 50 and 52 are sent to the inputs of divider 60, and to the input of an AND circuit 90. The output of the AND circuit 90 is used to gate the output 76 of divider 76 with a gate-controlled transistor switch 92.

A threshold comparator comprises a first operational amplifier 94 arranged to output a 0 if the gated output 76 is higher than a first threshold voltage Vth1 and a 1 otherwise, and a second operational amplifier 96 arranged to output a 0 if the gated output 76 is higher than a second threshold voltage Vth2 and a 1 otherwise. The inverted output of 94 and the output of 96 are input to an AND 98. The output of AND 98 is signal 54. Vth1 and Vth2 can be chosen such that the ratio range for which signal 54 is output (i.e. equal to 1) is of 0.8 to 1.2. Signal 54 can be sent to a counter (not shown) to count the number of particles detected.

Figure 6:
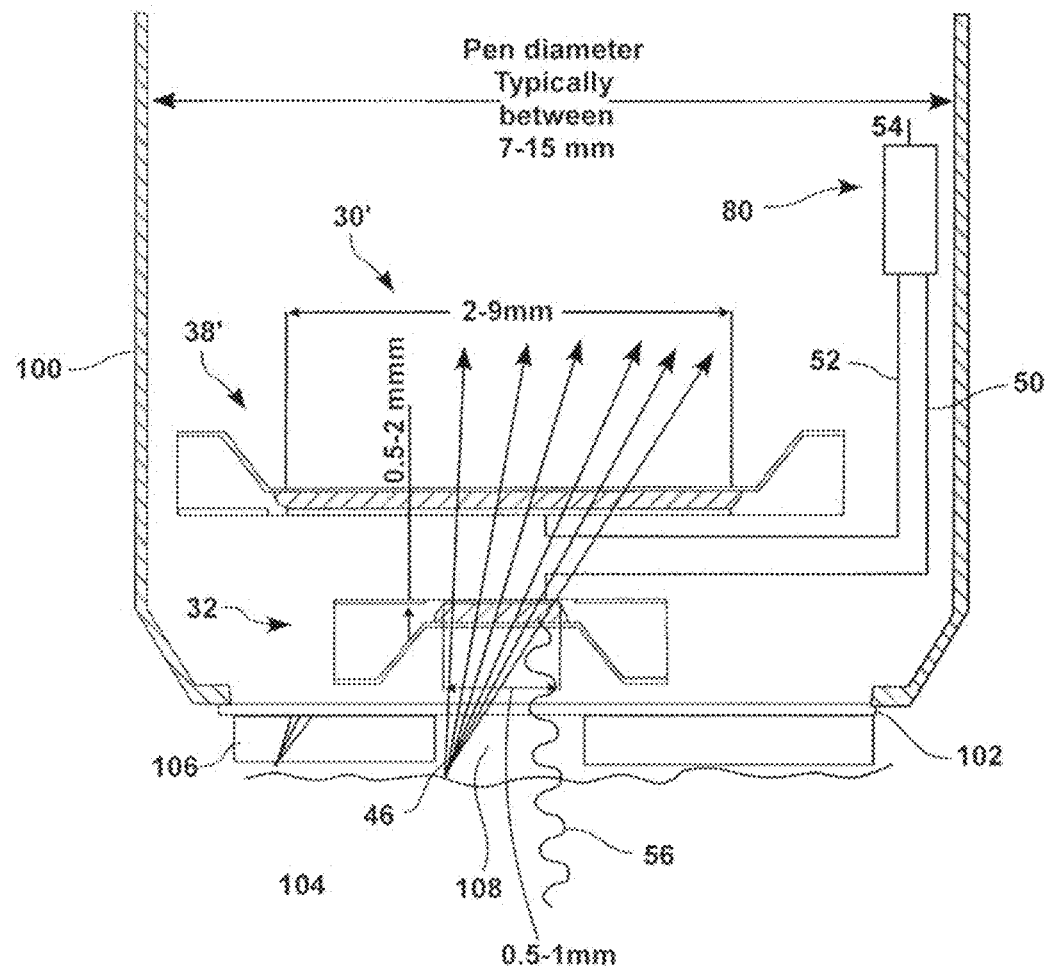
FIG. 6 illustrates schematically a Positron or Beta particle detector according to an embodiment of this presentation.

FIG. 6 illustrates schematically a cross-section of a positron or Beta particle detector 30' according to an embodiment of this presentation, operating as the detector 30 described in relation with FIG. 3. However, detector 30' comprises two radiation sensors 32, 38' that differ from the sensors 32, 38 of detector 30 in that the first sensor 32 has a first sensing surface (for example a circular surface having a diameter comprised between 0.5 and 1 mm) and the second sensor has a larger second sensing surface (for example a circular surface having a diameter comprised between 2 and 9 mm or larger).

According to an embodiment of this presentation, having a first sensor 32 with a small sensing surface allows improving the spatial resolution of detector 30', and having a second sensor 38' with a large sensing surface allows covering a larger solid angle of particle emission, thus improving the collecting efficiency and sensitivity of detector 38'. According to an embodiment of this presentation, detector 30' can be arranged in the tip 100 of a pen-shaped detector device having a polyester resin (such as Mylar) sheet, Beryllium window, or 3D printed Ti sheet, distal surface sheet 102 that acts as a window letting-in positron or Beta particles to hit detector 30'. Said positron or Beta particles can be emitted from for example a tissue 104 located in front of the tip 100 of the detector device. According to an embodiment of this presentation, a high Z mask 106, for example using a 500 micrometer to 1 mm thick stainless steel material, having a central hole 108 of diameter similar to the first sensing surface, is aligned with the first sensing surface in front of sheet 102 so that positrons or Beta particles from outside the detector device cannot hit detector 30' except through hole 108. According to an embodiment of this presentation, high Z mask 106 is arranged with respect to sensor 32 so that no positron 46 hits sensor 32 with a razing angle. According to an embodiment of this presentation, high Z mask 106 can be removable and can protect sheet 102 against mechanical damage as well as against contamination with a radiation source in tissue 104 (such as F18).

Figure 7:
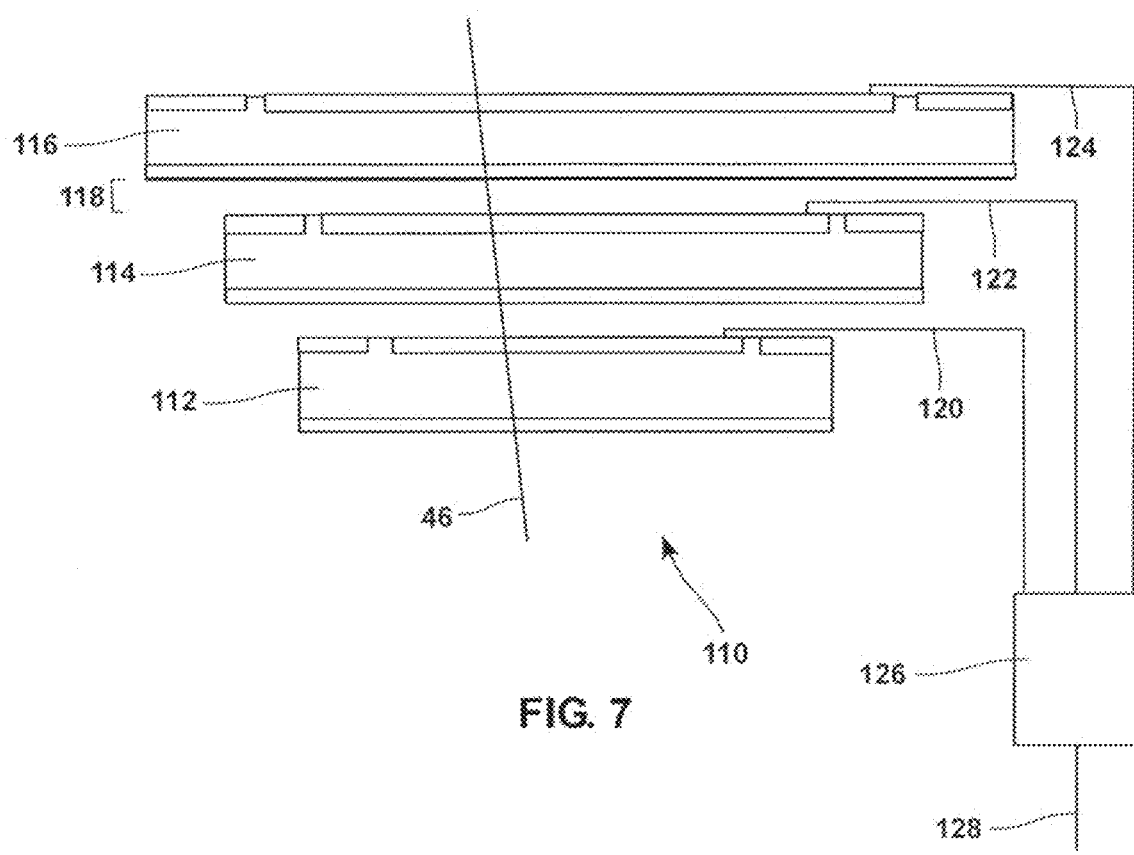
FIG. 7 illustrates schematically a Positron or Beta particle detector according to an embodiment of this presentation.

FIG. 7 illustrates schematically a cross-section of a positron or Beta particle detector 110 according to an embodiment of this presentation, constructed substantially as the detector 30' described in relation with FIG. 6. Detector 110 comprises a first radiation sensor 112 that can be similar to the sensor 32 described above, and can for example comprise a fully depleted PIN diode radiation sensor. As shown in FIG. 7, the junction of the PIN diode can be close to the top surface of sensor 112. Detector 110 comprises a second radiation sensor 114 that can be similar to the sensor 38' described above, and can also for example comprise a fully depleted PIN diode radiation sensor. As shown in FIG. 7, the junction of the PIN diode can be close to the top surface of sensor 114. As in the detector 30' described above, the sensor 112 has a smaller sensing surface than the sensor 114, which increases the precision and sensitivity of the detector. According to an embodiment of this presentation, detector 110 further comprises a third radiation sensor 116, made of a third material and having a third thickness between a bottom surface and a top surface, the bottom surface of the third radiation sensor 116 being arranged at a distance 118 from the top surface of the second radiation sensor 114. Sensor 116 can be of the same type and material as the first and/or second sensors of Detector 110. Sensor 116 can for example comprise a fully depleted PIN diode radiation sensor, for example having its junction close to its top surface. According to an embodiment of this presentation, and as illustrated in FIG. 7, the sensor 114 has a smaller sensing surface than the sensor 116.

According to an embodiment of this presentation, the material and thicknesses of the first, second and third sensors 112, 114, 116, as well as the distances between the sensors, are such that a positron or beta particle 46 can traverse the first radiation sensor 112, losing a first energy; then traverse the second radiation sensor 114, losing a second energy; then hit the third radiation sensor 116, losing a third energy. According to an embodiment of this presentation, the first radiation sensor 112 is arranged to produce a first sensor signal 120 that can be proportional to said first energy; the second radiation sensor 114 is arranged to produce a second sensor signal 122 that can be proportional to said second energy; and the third radiation sensor 116 is arranged to produce a third sensor signal 124 that can be proportional to said third energy. According to an embodiment of this presentation, radiation detector 110 comprises a detection circuit 126 that issues a detection signal 128 if the first, second and third sensor signals 120, 122, 124 indicate:

a/ a radiation particle losing said second energy in the second radiation sensor 114 within a first predetermined time range after a radiation particle losing said first energy the first radiation sensor 112; and b/ a radiation particle losing said third energy in the third radiation sensor 116 within a second predetermined time range after a radiation particle losing said second energy in said second radiation sensor 114.

According to an embodiment of this presentation, sensors 112, 114 and 116 and the distances between them can be provided such that, when produced in response to a same positron or Beta particle 46 losing energy in sensor 112, then in sensor 114, then in sensor 116, signals 120, 122 and 124 sent to a three-input AND circuit are sufficiently close in time to produce a "1" in output of the AND circuit. In such an instance, the sensors are so close and so thin that the predetermined time range between the three sensor signals is so small that the three sensor signals can be considered as simultaneous by the detection circuit 126. The chances of a gamma particle generating three signals seen as simultaneous by the detection circuit are very low. Thus, detector 110 has an improved rejection of Gamma-generated noise and is more sensitive.

According to an embodiment of this presentation, the first radiation sensor 112 is arranged such that said first sensor signal 120 is proportional to said first energy; the second radiation sensor 114 is arranged such that said second sensor signal 122 is proportional to said second energy; and the third radiation sensor 116 is arranged such that said third sensor signal 124 is proportional to said third energy; and circuit 126 is arranged to issue said detection signal 128 if the ratio of the second sensor signal 122 over the first sensor signal 120 is within a first predetermined ratio range and if the ratio of the third sensor signal 124 over the second sensor signal 122 is within a second predetermined ratio range. Circuit 126 can for example comprise a first circuit 80 having in input signals 120, 122 and a second circuit 80 having in input signals 122, 124; the outputs of the two circuits 80 being input to a AND circuit outputting signal 128.

Figure 8:
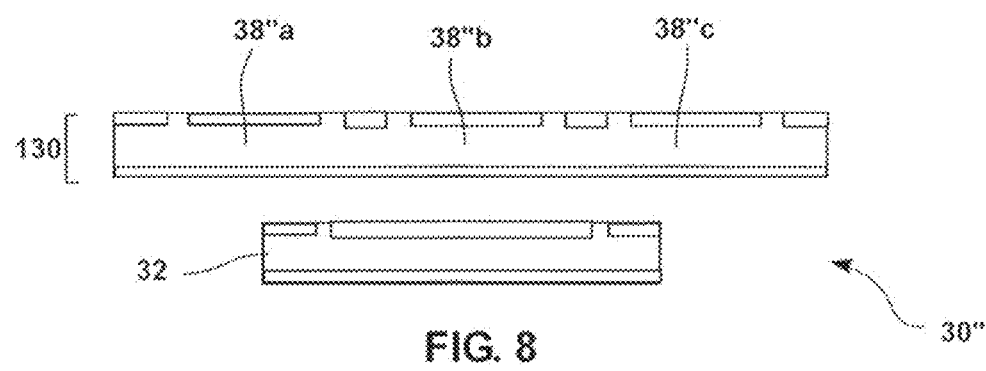
FIG. 8 illustrates schematically a Positron or Beta particle detector according to an embodiment of this presentation.

FIG. 8 illustrates schematically a cross-section of a detector 30" according to an embodiment of this presentation, having a first sensor 32 identical to the sensor 32 of the detector 30' described in relation with FIG. 6, but comprising an array 130 of second sensors (three shown in FIG. 8: 38"*a*, 38"*b*, 38"*c*) instead of the single sensor 38' of FIG. 6. According to an embodiment of this presentation, the array 130 of sensors can comprise an array of sensors of the same type as the first sensor 32, for example an array of fully depleted PIN diodes formed out of a single silicon wafer. In FIG. 8, the PIN diodes of array 130 are shown with their junction turned upward but they can also have their junction turned downward, as in FIG. 3. According to an embodiment of this presentation, the second sensors (38"*a*, 38"*b*, 38"*c*) can be arranged along an array having rows and columns. According to an embodiment of this presentation, each of the second sensors (38"*a*, 38"*b*, 38"*c*) of the array 130 forms a pair of sensors with the single first sensor 32; and each pair of sensors operates as a detector 30 as described for example in relation with the pair of sensors 38, 32 of FIG. 3. According to an embodiment of this presentation, a counting of the detection signals produced for each pair of sensors can be used as a gray value for a pixel of a display (not shown) associated with the pair of sensors. Thus, detector 30" can be used for imaging in real time sources of positrons or Beta radiations in a nearby tissue.

FIG. 9 illustrates a method according to an embodiment of this presentation, the method comprising:

Providing 132 a first radiation sensor made of a first material and having a first thickness between a first surface and a second surface, wherein: the first material and the first thickness are such that a positron or beta particle can traverse the first radiation sensor from first to second surface, thus losing a first energy;

Providing 134 a second radiation sensor made of a second material and having a second thickness between a first surface and a second surface, the first surface of the second radiation sensor being arranged at a first distance from the second surface of the first radiation sensor;

Generating 136 a first sensor signal in response to a radiation particle losing said first energy in the first radiation sensor. Optionally, the first sensor signal can be proportional to said first energy Generating 138 a second sensor signal in response to a radiation particle losing a second energy in the second radiation sensor. Optionally, the second sensor signal can be proportional to said second energy; and Issuing 140 a detection signal if the first and second sensor signals indicate a radiation particle losing said second energy in the second radiation sensor within a predetermined time range after a radiation particle losing said first energy in said first radiation sensor and not issuing said detection signal otherwise. Optionally the detection signal can be issued only if the ratio of the second sensor signal over the first sensor signal is within a predetermined ratio range.

Figure 10:
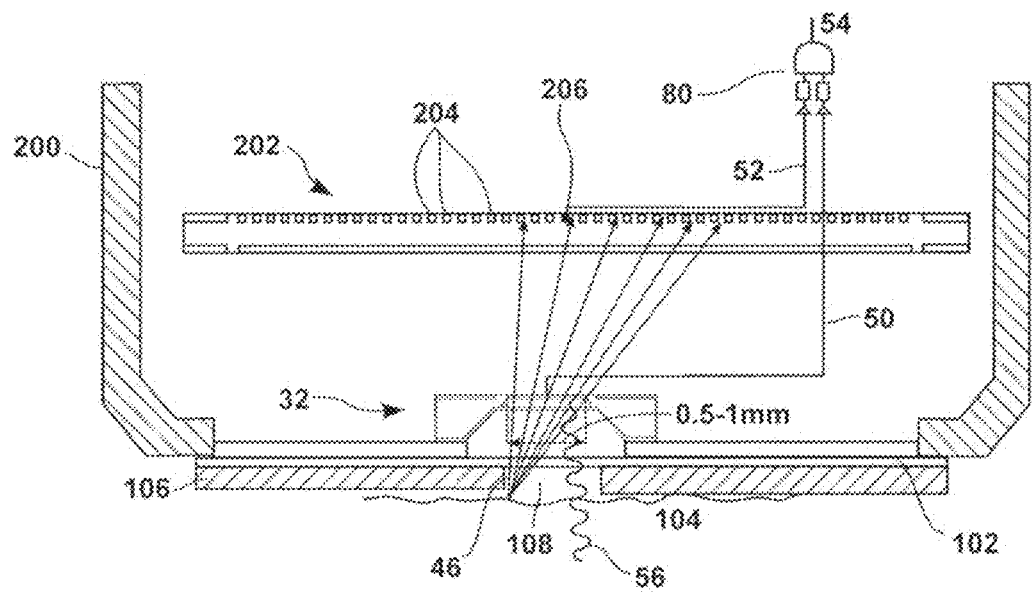
FIG. 10 illustrates a Positron or Beta particle detector according to an embodiment of this presentation.

FIG. 10 illustrates the tip 200 of a Positron or Beta particle detector according to an embodiment of this presentation. Tip 200 is similar to the tip 100 illustrated in FIG. 6, and same reference numbers indicate same features in FIGS. 6 and 10. Tip 200 however differs from tip 100 in that the second sensor is a Silicon Drift Detector 202. In the embodiment illustrated in FIG. 10, the ring electrodes 204 and collection electrode 206 of detector 202 are arranged on the second (top) surface of detector 202. As in tip 100, the second sensor has a larger surface than the first sensor. According to an embodiment of this presentation, however, the first and second sensors can have a same surface.

Figure 11:
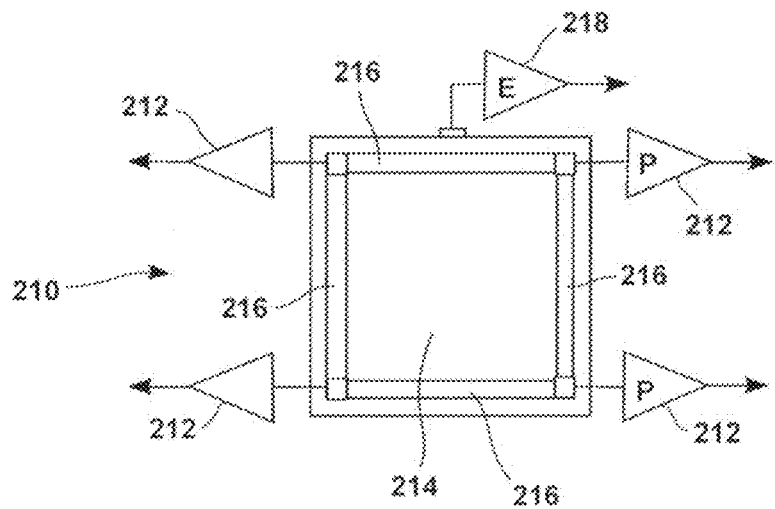
FIG. 11 illustrates a 2D position-sensitive sensor.

FIG. 11 illustrates a 2D resistive position-sensitive sensor 210, such as described in "*Performance Evaluation Of Novel Square-Bordered Position-Sensitive Silicon Detecors With Four Corner Readout*" by A. Banu(1), Y. Li(1), M. McCleskey(1), M. Bullough(2), S. Walsh(2), C. A. Gagliardi (1), L. Trache(1), R. E. Tribble(1), and C. Wilburn(2). (with (1): Cyclotron Institute, Texas A&M University, College Station, Tex. 77843-3366, USA; and (2): Micron Semiconductor Ltd., 1 Royal Buildings, Marlborough Road, Lancing Business Park, Lancing, Sussex, BN15 8SJ, UK). Sensor 210 comprises four charge sensitive amplifiers 212 for position determination, connected to diagonally opposed ends of a resistive anode 214 having a given sheet resistance; the resistive anode 214 having its edges surrounded by lines 216 having a given low resistance per unit length; and a charge sensitive amplifier 218 for energy determination connected to a low resistance junction electrode (not shown). Sensor 210 operates by making a pulse sharing between the outputs of amplifiers 212, and analyzing each signal height taking into account the total particle energy derived from the output of amplifier 218. It is noted that sensor 210 can easily be transformed in a 1D resistive position-sensitive sensor (not shown) if it only comprises two amplifiers 212 connected to opposite ends of resistive anode 214 or by considering the added outputs of two pairs of the amplifiers 212 of FIG. 11.

Figure 12:
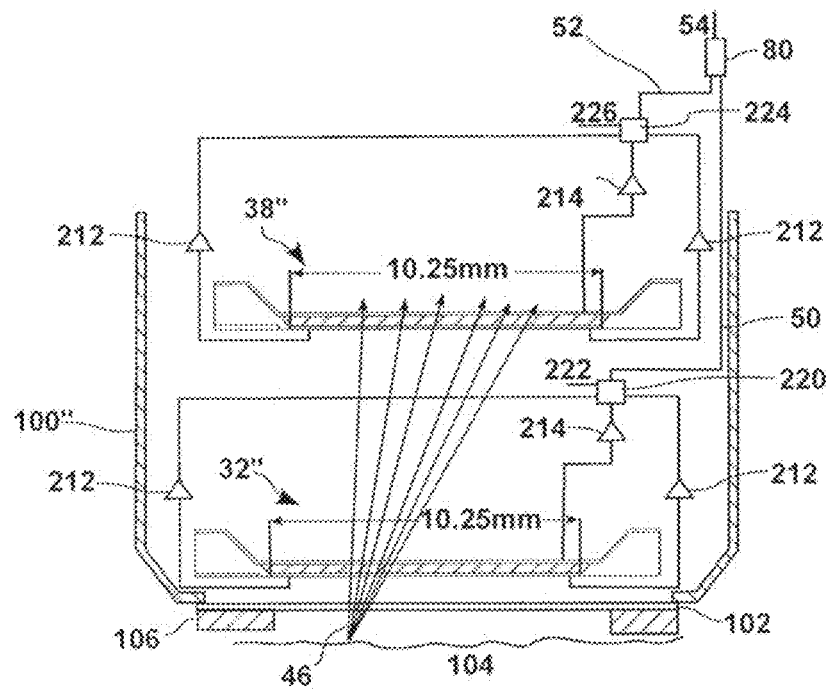
FIG. 12 illustrates a Positron or Beta particle detector according to an embodiment of this presentation.

FIG. 12 illustrates the tip 100" of a Positron or Beta particle detector according to an embodiment of this presentation. Tip 100" is similar to the tip 100 illustrated in FIG. 6, and same reference numbers indicate same features in FIGS. 6 and 12. Tip 100" differs from tip 100 however in that tip 100" the first sensor 32" and the second sensor 38" are both 2D resistive position-sensitive sensors such as illustrated in FIG. 11. In the embodiment illustrated in FIG. 12, first and second sensors 32", 38" have a same sensing surface area. According to an embodiment of this presentation, first sensor 32" can also have a smaller sensing surface area than second sensor 38". According to an embodiment of this presentation, the amplifiers 212 and 214 of sensor 32" are connected to a processing circuit 220 that produce a 2D position signal 222 as well as first sensor signal 50. Similarly, the amplifiers 212 and 214 of sensor 38" are connected to a processing circuit 224 that produce a 2D position signal 226 as well as second sensor signal 52. As in FIG. 6, a circuit 50 generates a detection signal 54 if signal 52 is generated just after (or quasi simultaneously after) signal 50. 2D position signals 222 and 226 can be used to generate a 3D picture showing the position of emission of positron or beta particle 46.

Figure 13:
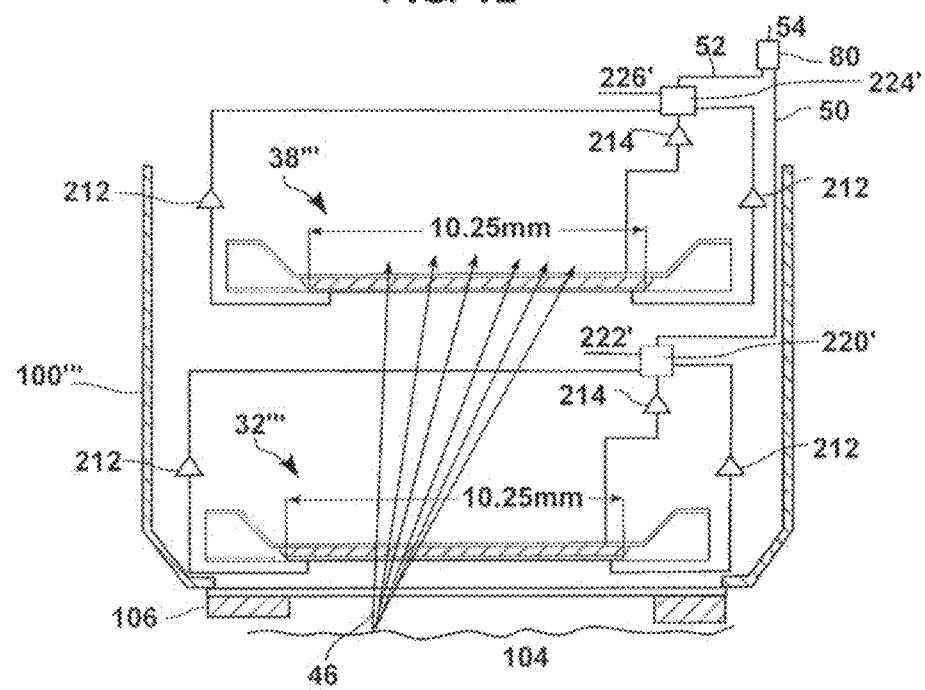
FIG. 13 illustrates a Positron or Beta particle detector according to an embodiment of this presentation.

FIG. 13 illustrates the tip 100''' of a Positron or Beta particle detector according to an embodiment of this presentation. Tip 100''' is similar to the tip 100" illustrated in FIG. 12, and same reference numbers indicate same features in FIGS. 12 and 13. Tip 100''' differs from tip 100" however in that tip 100''' the first sensor 32''' and the second sensor 38''' are both 1D resistive position-sensitive sensors such as described in relation with FIG. 11. In the embodiment illustrated in FIG. 13, first and second sensors 32", 38" are arranged to detect a 1D position in perpendicular directions. According to an embodiment of this presentation, the amplifiers 212 and 214 of sensor 32''' are connected to a processing circuit 220' that produce a 1D position signal 222' as well as first sensor signal 50. Similarly, the amplifiers 212 and 214 of sensor 38''' are connected to a processing circuit 224' that produce a 1D position signal 226' as well as second sensor signal 52. 1D position signals 222 and 226 can be used to generate a rough 3D picture showing the position of emission of positron or beta particle 46.

Figure 14:
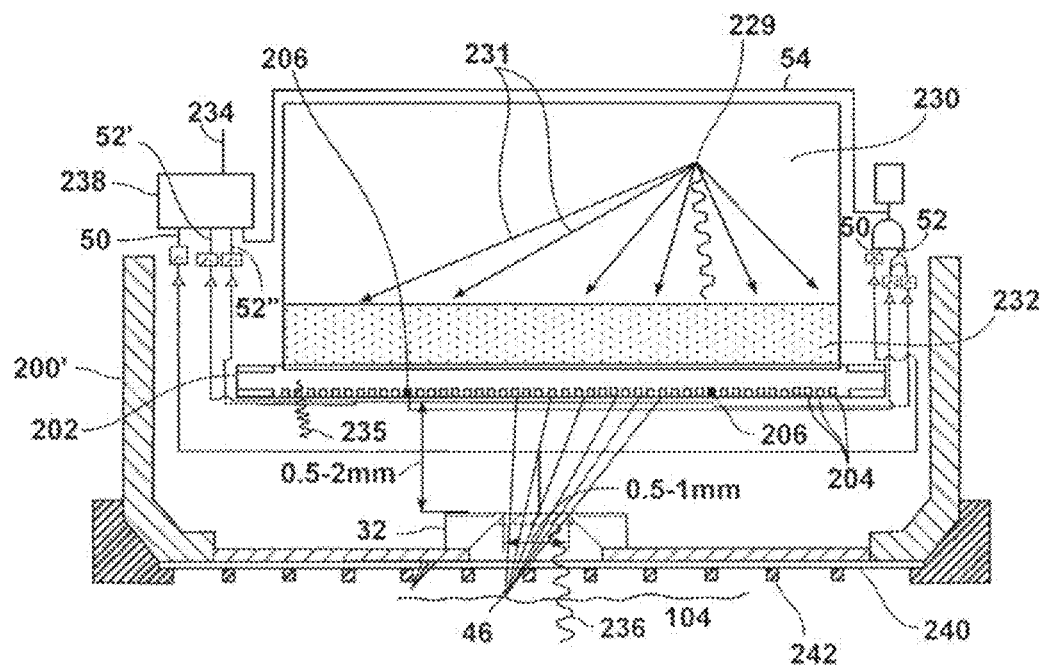
FIG. 14 illustrates a radiation detector that comprises a Positron or Beta particle detector according to an embodiment of this presentation.

FIG. 14 illustrates the tip 200' of a radiation detector that comprises a Positron or Beta particle detector similar to the Positron or Beta particle detector described in relation with FIG. 10. Tip 200' is similar to the tip 200 illustrated in FIG. 10, and same reference numbers indicate same features in FIGS. 10 and 14. Tip 200' however differs from tip 200 in that the second sensor/Silicon Drift Detector 202 is flipped and has its ring electrodes 204 and collection electrodes 206 arranged on the first (bottom) surface of detector 202. Further, a scintillator layer 230 sensitive to gamma particles is arranged with a first (bottom) surface facing the second (top) surface of the second radiation sensor; such that radiation particles 231 generated by the scintillator layer 230 in response to being hit by a gamma particle 229 hit the second surface of detector 202.

According to an embodiment of this presentation, an electrically insulating layer 232, for example made of optically transparent silicon, can be arranged between the second surface of detector 202 and the first surface of scintillator 230. According to an embodiment of this presentation, an opaque aluminum layer can be arranged between the first and second sensors, to prevent transmission of any light particle from the scintillator layer to the first sensor. According to an embodiment of this presentation, the scintillator layer can be a 5 to 10 mm layer of LaBr3, CeBr3 or CsI. According to an embodiment of this presentation, the silicon pad can be 2 mm thick. According to an embodiment of this presentation, the first sensor can have a sensing surface with a diameter comprised between 0.5 and 1 mm and the distance between the second surface of the first sensor and the first surface of the second sensor can be of 0.5 to 2 mm.

A patient can absorb two type of markers: one emitting beta particles or positrons and one emitting gamma particles (or 1 marker that emits both beta an/or positrons AND gammas). The detection of both beta particles or positrons and gamma particles can help getting a better picture of which cells get marked.

As detailed above in relation with FIG. 3, radiation particles such as gamma particles can hit the first sensor (here sensor 32) and lose energy in the sensor, but this triggers a Compton scattering in the first sensor that rarely triggers loss of energy in the second sensor of a Compton scattering generated particle. Such occurrence of a gamma particle (236 in FIG. 14) hitting first sensor 32 thus generally triggers generation of a first sensor signal 50 but not of a detection signal 54. According to an embodiment of this presentation, the detector comprises a circuit 238 for generating a gamma particle detection signal 234 if first sensor signal 52 is present but not detection signal 54. Similarly, a gamma particle (235 in FIG. 14) can hit the second sensor 202 directly, thus causing sensor 202 to generate a second sensor signal (52', 52") not within the predetermined time range of first sensor signal 50, whereby no detection signal 54 is generated. Further, if a gamma particle 229 hits scintillator 230, it generates particles 231 that eventually hit detector 202, thus causing detector 202 to generate a second sensor signal 52', 52" not within the predetermined time range of first sensor signal 50, whereby no detection signal 54 is generated. According to an embodiment of this presentation, circuit 238 generates a gamma particle detection signal 234 if a second sensor signal 52', 52" is present but not detection signal 54.

In the embodiment illustrated in FIG. 14, second sensor 202 comprises two collection electrodes 206. If a gamma particle (235 in FIG. 14) hits the second sensor 202 directly, generally only one collection electrode 206 receives the energy from the particle, and sensor 202 generates only one second sensor signal 52' or 52" (direct hit second sensor signal). On another hand, when a gamma particle 229 hits scintillator 230, it generates particles 231 that eventually hit all over detector 202, thus causing detector 202 to generate a plurality of quasi-simultaneous second sensor signals 52', 52" (scintillation second sensor signal). According to an embodiment of this presentation, circuit 238 is arranged to distinguish a gamma particle detection signal 234 deriving from a direct hit of a sensor by a gamma particle (deriving from a single second sensor signal) and a gamma particle detection signal 234 deriving from a scintillator hit by a gamma particle (deriving from multiple quasi-simultaneous second sensor signals).

As illustrated in FIG. 14, the tip of the detector can comprise a window 240 transparent to the particles to be detected, for example made of Mylar, Beryllium, Titanium or aluminum. According to an embodiment of this presentation, window 240 can be protected by a distal grid 242, for example made of metal.

Figure 15:
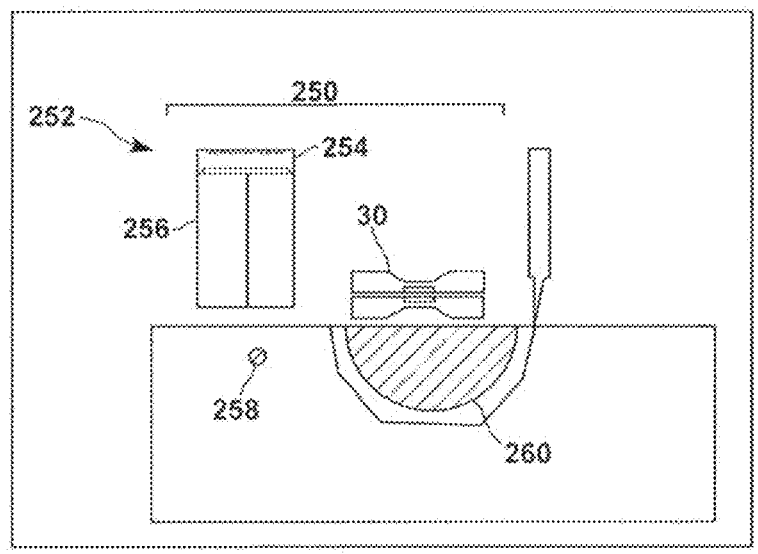
FIG. 15 illustrates a radiation detector that comprises a Positron or Beta particle detector according to an embodiment of this presentation.

FIG. 15 illustrates a radiation detector 250 that uses a positron or beta particle detector 30 according to an embodiment of this presentation. The detector 30 illustrated in FIG. 15 is the same as the one shown in FIG. 3, but it can be any of the positron or beta particle detector taught by this presentation. Detector 250 further comprises a gamma particle detector 252, which can for example comprise a four-quadrant Silicon Drift Detector 254 coupled to a four quadrant scintillator 256. Other Gamma detectors can comprise Scintillation detector, CdZnTe, HPGe detectors. Making detector 250 a four quadrant detector allows detecting the position of a source of gamma particles. Thus, arranging detector 250 close to detector 30 can allow detecting a metastasis 258 in the vicinity of the resection region of a tumor 260.

A detector 250 can for example be used as follows: after the direction of the gamma source is localized in a given region using gamma detector 252, a surgeon will cut the tissue in this region in depth (typically 1 cm) and open the tissue. He will then insert the detector 250 in the cut tissue and will then only look to positrons to determine that the cut is clean. According to an embodiment of this presentation, gamma detector 252 can alternatively comprise one of: a SDD coupled to a scintillator (few mm thickness); a pin detector coupled to a scintillator (few mm thickness); a CdZnTe detector (few mm thickness); and a 1 mm to 1.5 mm thick silicon detector (silicon is less efficient in gamma absorption than scintillator material of CdZnTe but may be sufficient for hotspot localization).

Figure 16:
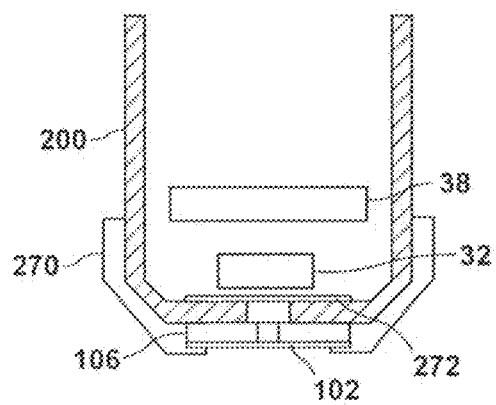
FIG. 16 illustrates the tip of a Positron or Beta particle detector pen according to an embodiment of this presentation.

FIG. 16 illustrates an embodiment of the tip 200 of a Positron or Beta particle detector pen such as illustrated in FIG. 6. In this embodiment, collimator 106 and window 102 are attached to a removable, sterilizable distal cap 270. According to an embodiment of this presentation, a light-tight window 272 can be arranged at the bottom inner end of the housing of tip 200.

Figure 17:
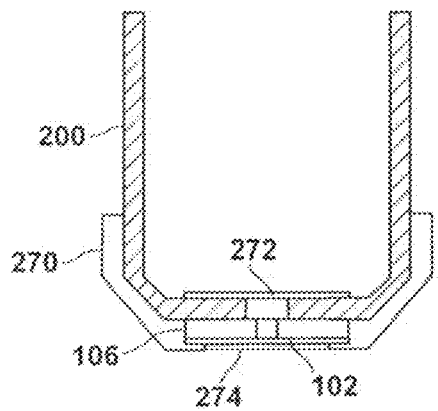
FIG. 17 illustrates the tip of a Positron or Beta particle detector pen according to an embodiment of this presentation.

FIG. 17 illustrates an embodiment of the tip 200 of a Positron or Beta particle detector pen that differs from the embodiment illustrated in FIG. 16 by its sterilizable distal cap 270', which additionally to cap 270 comprises a distal grid 274.

Figure 18:
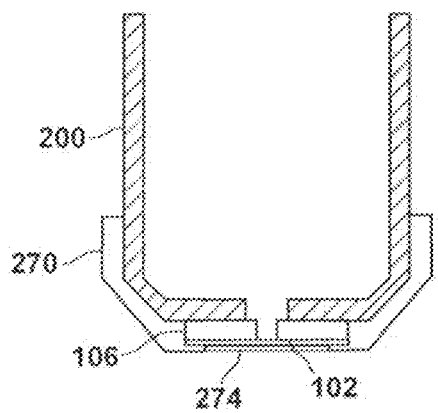
FIG. 18 illustrates the tip of a Positron or Beta particle detector pen according to an embodiment of this presentation.

FIG. 18 illustrates an embodiment of the tip 200 of a Positron or Beta particle detector pen that differs from the embodiment illustrated in FIG. 17 by not having light-tight window 272 arranged at the bottom inner end of the housing of tip 200, and by having a light-tight window 102.

Figure 19:
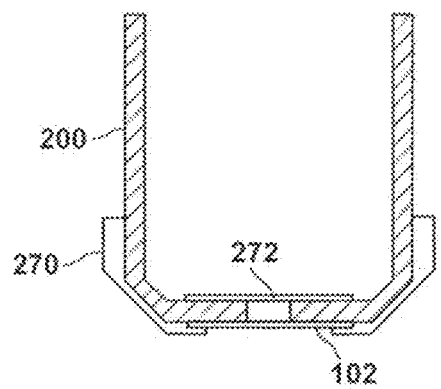
FIG. 19 illustrates the tip of a Positron or Beta particle detector pen according to an embodiment of this presentation.

FIG. 19 illustrates an embodiment of the tip 200 of a Positron or Beta particle detector pen that differs from the embodiment illustrated in FIG. 16 by not having collimator 106.

Figure 20:
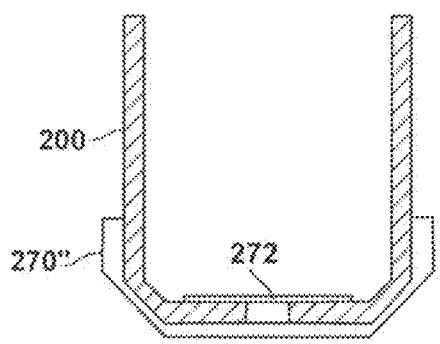
FIG. 20 illustrates the tip of a Positron or Beta particle detector pen according to an embodiment of this presentation.

FIG. 20 illustrates an embodiment of the tip 200 of a Positron or Beta particle detector pen that differs from the embodiment illustrated in FIG. 19 by having distal cap 270 and window 102 fused into a single material disposable distal cap 270".

Figure 21:
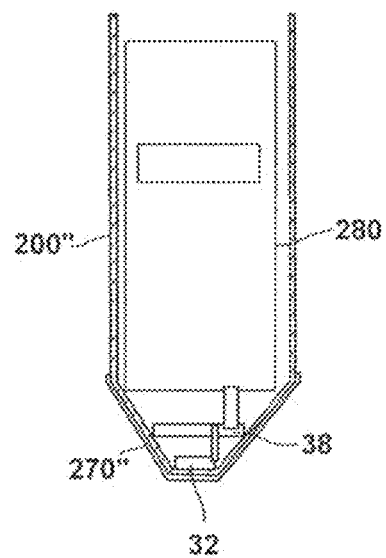
FIG. 21 illustrates the tip of a Positron or Beta particle detector pen according to an embodiment of this presentation.

FIG. 21 illustrates an embodiment of the tip 200" of a Positron or Beta particle detector pen that differs from the embodiment illustrated in FIG. 20 by having a conical distal end arranged to accommodate the increasing size of sensors 32 and 38 and a cylindrical body arranged to accommodate the electronics and power source 280 of the detector.

Figure 22:
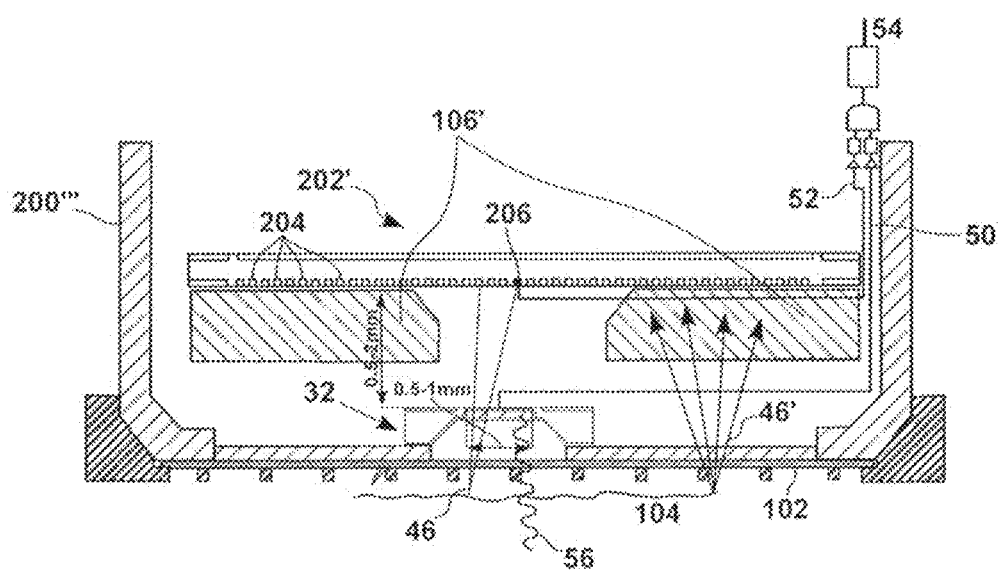
FIG. 22 illustrates a Positron or Beta particle detector according to an embodiment of this presentation.

FIG. 22 illustrates the tip 200''' of a radiation detector that comprises a Positron or Beta particle detector similar to the Positron or Beta particle detector 200' described in relation with FIG. 14. Tip 200''' is similar to the tip 200' illustrated in FIG. 14, and same reference numbers indicate same features in FIGS. 14 and 22. Tip 200''' however differs from tip 200' in that the second sensor/Silicon Drift Detector 202' is flipped with respect to detector 202 and has its ring electrodes 204 and collection electrode 206 arranged on the second (top) surface of detector 202'. Further, a collimator 106' is arranged between first sensor 32 and second sensor 202'. According to an embodiment of this presentation, collimator 106' is made of a material thick enough to stop radiation particles and is arranged to prevent particles 46' that have not traversed sensor 32 from hitting sensor 202'. According to an embodiment of this presentation, collimator 106' comprises a conical central aperture; the angle of the conical aperture being provided so that any particle 46 that has traversed first sensor 32 can reach sensor 202'.

Modifications, additions, or omissions may be made to the systems, apparatuses, and methods described herein without departing from the scope of the inventive concepts. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

All elements, parts and steps described herein are preferably included. It is to be understood that any of these elements, parts and steps may be replaced by other elements, parts and steps or deleted altogether as will be obvious to those skilled in the art.

Broadly, this writing discloses at least the following. A positron or beta particle detector comprising a first radiation sensor made of a first material and having a first thickness between a first surface and a second surface; and a second radiation sensor made of a second material and having a second thickness between a first surface and a second surface, the second radiation sensor being arranged at a first distance from the first radiation sensor; wherein the first material and the first thickness are such that a positron or beta particle can traverse the first radiation sensor from first to second surface and hit the first surface of the second radiation sensor.

What is claimed is:

1. A positron or beta particle detector comprising:
   a first radiation sensor made of a first material and having a first thickness between a first surface and a second surface; and
   a second radiation sensor made of a second material and having a second thickness between a first surface and a second surface, the first surface of the second radiation sensor being arranged at a first distance from the second surface of the first radiation sensor;
   wherein: the first material and the first thickness are such that a positron or beta particle can traverse the first radiation sensor from first to second surface and hit the first surface of the second radiation sensor, a positron or beta particle losing a first energy when traversing the first radiation sensor; the second material and second thickness being such that a positron or beta particle having traversed the first radiation sensor loses a second energy in the second radiation sensor; wherein:
   the first radiation sensor is arranged to generate a first sensor signal in response to a radiation particle losing said first energy in the first radiation sensor, the first radiation sensor being arranged such that said first sensor signal is proportional to said first energy; and:
   the second radiation sensor is arranged to generate a second sensor signal in response to a radiation particle losing said second energy in the second radiation sensor, the second radiation sensor being arranged such that said second sensor signal is proportional to said second energy;
   the radiation detector being arranged to issue a detection signal if the first and second sensor signals indicate a radiation particle losing said second energy in the second radiation sensor within a predetermined time range after a radiation particle losing said first energy in said first radiation sensor; and if the ratio of the second sensor signal over the first sensor signal is within a predetermined ratio range.

2. The positron or beta particle detector of claim 1, wherein the first energy is equal to the second energy.

3. The positron or beta particle detector of claim 1, wherein the first material is equal to the second material.

4. The positron or beta particle detector of claim 3, wherein the first and second sensors each comprise a PIN diode sensor.

5. The positron or beta particle detector of claim 1, wherein the first thickness is equal to the second thickness.

6. The positron or beta particle detector of claim 1, wherein the first sensor has a first sensing surface and the second sensor has a second sensing surface; the second sensing surface being larger than the first sensing surface.

7. The positron or beta particle detector of claim 1, wherein the second sensor is one of an array of second sensors.

8. The positron or beta particle detector of claim 1, wherein at least one of the first and second radiation sensor is a position-sensitive radiation sensor arranged for providing a sensor signal indicative of a position along at least one direction where the particle lost energy in said position-sensitive radiation sensor.

9. The positron or beta particle detector of claim 8, wherein the position-sensitive radiation sensor comprises two charge sensitive amplifiers connected to opposite ends of the position-sensitive radiation sensor.

10. The positron or beta particle detector of claim 8, wherein the position-sensitive radiation sensor comprises four charge sensitive amplifiers connected to diagonally opposed ends of the position-sensitive radiation sensor.

11. The positron or beta particle detector of claim 1, further comprising:
    a third radiation sensor made of a third material and having a third thickness between a first surface and a second surface, the first surface of the third radiation sensor being arranged at a second distance from the second surface of the second radiation sensor;
    wherein: the first material and thickness and the second material and thickness are further such that a positron or beta particle can traverse the first radiation sensor from first to second surface, then traverse the second radiation sensor from first to second surface, then hit the first surface of the third radiation sensor, a positron or beta particle having traversed the first and second radiation sensors losing a third energy in the third radiation sensor.

12. The positron or beta particle detector of claim 11, wherein the first energy is equal to the second energy and to the third energy.

13. The positron or beta particle detector of claim 11, wherein the first material is equal to the second material and to the third material.

14. The positron or beta particle detector of claim 11, wherein the first, second and third sensors each comprise a PIN diode sensor.

15. The positron or beta particle detector of claim 11, wherein the first thickness is equal to the second thickness and to the third thickness.

16. The positron or beta particle detector of claim 11, wherein the first sensor has a first sensing surface, the second sensor has a second sensing surface and the third sensor has a third sensing surface; the third sensing surface being larger than the second sensing surface and the second sensing surface being larger than the first sensing surface.

17. The positron or beta particle detector of claim 11, wherein the third sensor is one of an array of third sensors.

18. The positron or beta particle detector of claim 11, wherein:
the third radiation sensor is arranged to generate a third sensor signal in response to a radiation particle losing said third energy in the third radiation sensor;
the positron or beta particle detector being arranged to issue a detection signal if the first, second and third sensor signals indicate:
a radiation particle losing said second energy in the second radiation sensor within a first predetermined time range after a radiation particle losing said first energy the first radiation sensor; and
a radiation particle losing said third energy in the third radiation sensor within a second predetermined time range after a radiation particle losing said second energy in said second radiation sensor.

19. The positron or beta particle detector of claim 18, wherein:
the third radiation sensor is arranged such that said third sensor signal is proportional to said third energy;
wherein the radiation detector is arranged to issue said detection signal if the ratio of the second sensor signal over the first sensor signal is within a first predetermined ratio range and if the ratio of the third sensor signal over the second sensor signal is within a second predetermined ratio range.

20. The positron or beta particle detector of claim 1, further comprising a collimator between the first and second radiation sensors; the collimator having an aperture centered on an axis crossing normally the center of the first sensor and being provided for preventing any beta or positron particle not having traversed the first sensor from hitting the second sensor.

21. The positron or beta particle detector of claim 1, arranged in the tip of elongated detector device having a distal window, the distal window comprising one of a polyester resin sheet, a Berylium window, and a 3D printed Ti sheet; the distal window letting positron or Beta particles hit the detector.

22. A radiation detector comprising:
the positron or beta particle detector of claim 1; and
a scintillator layer sensitive to gamma particles, the scintillator layer having a first surface arranged facing the second surface of the second radiation sensor, such that radiation particles generated by the scintillator in response to being hit by a gamma particle hit the second surface of the second radiation sensor.

23. The radiation detector of claim 22, wherein:
the radiation detector is arranged to issue a positron or beta particle detection signal if the first and second sensor signals indicate a radiation particle losing energy in the second radiation sensor within a predetermined time range after a radiation particle losing said first energy in said first radiation sensor; and
the radiation detector is arranged to issue a gamma particle detection signal if the first and second sensor signals indicate a radiation particle losing energy in the second radiation sensor not within said predetermined time range after a radiation particle losing said first energy in said first radiation sensor; or a radiation particle losing energy in the first radiation sensor not within said predetermined time range before a radiation particle losing energy in said second radiation sensor.

24. The radiation detector of claim 23, wherein the second radiation sensor is a Silicon Drift Detector.

25. The radiation detector of claim 24, wherein the Silicon Drift Detector comprises two anodes on its first surface; the radiation detector being arranged to issue:
a direct hit second sensor signal in response to only one of the two anodes detecting a radiation particle losing energy in the second radiation sensor; and
a scintillation second sensor signal in response to the two anodes detecting simultaneously a radiation particle losing energy in the second radiation sensor.

26. A radiation detector comprising:
the positron or beta particle detector of claim 1; and
a gamma particle detector.

27. The radiation detector of claim 26, wherein the gamma particle detector is a 4-quadrants gamma particle detector.

28. A method for detecting positrons or beta particles, the method comprising:
providing a first radiation sensor made of a first material and having a first thickness between a first surface and a second surface; and
providing a second radiation sensor made of a second material and having a second thickness between a first surface and a second surface, the first surface of the second radiation sensor being arranged at a first distance from the second surface of the first radiation sensor;
wherein: the first material and the first thickness are such that a positron or beta particle can traverse the first radiation sensor from first to second surface and hit the first surface of the second radiation sensor, a positron or beta particle losing a first energy when traversing the first radiation sensor; the second material and second thickness being such that a positron or beta particle having traversed the first radiation sensor loses a second energy in the second radiation sensor;
the method further comprising:
with the first radiation sensor, generating a first sensor signal in response to a radiation particle losing said first energy in the first radiation sensor, the first radiation sensor being arranged such that said first sensor signal is proportional to said first energy; and
with the second radiation sensor, generating a second sensor signal in response to a radiation particle losing said second energy in the second radiation sensor, the second radiation sensor being arranged such that said second sensor signal is proportional to said second energy; and
issuing a detection signal if the first and second sensor signals indicate a radiation particle losing said second energy in the second radiation sensor within a predetermined time range after a radiation particle losing said first energy in said first radiation sensor, and if the ratio of the second sensor signal over the first sensor signal is within a predetermined ratio range and not issuing said detection signal otherwise.

* * * * *